(12) United States Patent
Karino

(10) Patent No.: US 7,269,165 B2
(45) Date of Patent: Sep. 11, 2007

(54) SERVER, COMMUNICATION DEVICE, COMMUNICATION SYSTEM AND INTERNET PROTOCOL ADDRESS NOTIFICATION METHOD

(75) Inventor: Shuji Karino, Chiryu (JP)

(73) Assignee: DENSO Corporation, Kariya (JP)

( * ) Notice: Subject to any disclaimer, the term of this patent is extended or adjusted under 35 U.S.C. 154(b) by 1065 days.

(21) Appl. No.: 10/269,233

(22) Filed: Oct. 11, 2002

(65) Prior Publication Data

US 2003/0072315 A1   Apr. 17, 2003

(30) Foreign Application Priority Data

Oct. 15, 2001   (JP)   ............... 2001-316751

(51) Int. Cl.
*H04L 12/66* (2006.01)
*H04L 12/56* (2006.01)
(52) U.S. Cl. ........................ 370/352; 370/389
(58) Field of Classification Search ............... None
See application file for complete search history.

(56) References Cited

U.S. PATENT DOCUMENTS

| 6,603,761 | B1 * | 8/2003 | Wang et al. | 370/352 |
| 6,690,669 | B1 * | 2/2004 | Tsuchiya et al. | 370/392 |
| 6,845,094 | B1 * | 1/2005 | Zhang | 370/349 |
| 7,103,032 | B2 * | 9/2006 | Kobayashi | 370/352 |
| 2001/0004361 | A1 | 6/2001 | Kobayashi | |
| 2002/0093956 | A1 * | 7/2002 | Gurin | 370/389 |
| 2003/0043781 | A1 * | 3/2003 | Proctor et al. | 370/352 |

FOREIGN PATENT DOCUMENTS

JP   11-331371   11/1999

OTHER PUBLICATIONS

Ayorkor Mills-Tettey, "Mobile Voice Over IP (MVOIP): An Application-level Protocol", Dartmouth College Computer Science Technical Report TR2001-390, Jun. 1, 2001.
H. Schulzrinne, E. Wedlund, "Application Layer Mobility Using SIP", pp. 47-57, Dept. of Computer Science, Columbia University, MCC Review, Jul. 2000.
Notice of Rejection dated Dec. 21, 2004 in Japanese Application No. 2001-316751, with English translation.

* cited by examiner

*Primary Examiner*—Huy D. Vu
*Assistant Examiner*—Clemence Han
(74) *Attorney, Agent, or Firm*—Harness, Dickey & Pierce, PLC

(57) ABSTRACT

A server stores a table of correspondence between phone numbers and dynamic addresses of an internet protocol assigned or to be assigned to cellular phones. When the server is notified of a phone number of a receiving cellular phone by a transmitting cellular phone, it searches the table to obtain the dynamic address corresponding to the phone number of the receiving cellular phone. The server then notifies the transmitting cellular phone of the obtained dynamic address. The transmitting cellular phone can thus identify the dynamic address assigned or to be assigned to the receiving cellular phone. Thus, the transmitting cellular phone is enables to communicate with the receiving cellular phone through the internet protocol.

8 Claims, 4 Drawing Sheets

SERVER, COMMUNICATION DEVICE, COMMUNICATION SYSTEM AND INTERNET PROTOCOL ADDRESS NOTIFICATION METHOD

CROSS REFERENCE TO RELATED APPLICATION

This application is based on and incorporates herein by reference Japanese Patent Application No. 2001-316751 filed on Oct. 15, 2001.

FIELD OF THE INVENTION

The present invention relates to a server assigning a dynamic internet protocol (IP) address, a communication device assigned the IP address, a system provided with the server and the communication device, and an IP address notification method.

BACKGROUND OF THE INVENTION

A communication device such as a cellular phone requests dial-up connection to a server on the Internet to communicate with the server by being assigned an internet protocol (IP) address. A user of the communication device thereby is able to surf homepages prepared in servers on the Internet. Incidentally, the communication device having a dynamic IP address can communicate through an IP with another communication device having a static IP address by identifying the communication device based on the static IP address, which has been previously assigned.

The communication device having the dynamic IP address cannot contrarily communicate through the IP with another communication device having a dynamic IP address owning to the difficulty of identifying the communication device based on the dynamic IP address, which has been temporarily chosen and assigned by the server.

In a system including cellular phones as the communication devices, as shown in FIG. 4, dynamic IP addresses X and Y (for instance, 32 bit or 128 bit figures) are assigned to cellular phones 1 and 2, respectively. Here, the cellular phone 1, which has the dynamic IP address X, cannot identify the cellular phone 2 due to impossibility of identifying the unknown dynamic IP address Y. As a result, it is impossible to perform communication through the IP with the cellular phone 2.

SUMMARY OF THE INVENTION

An object of the present invention is to provide a server, a communication device, a communication system and an IP address notification method which enable communication through an IP between the communication devices having dynamic IP addresses to enhance usability of the communication device users.

To achieve the above object, a server is provided with a table showing correspondence between identification numbers (ID) identifying communication devices and dynamic IP addresses being assigned or to be assigned to the communication devices. It searches the table to obtain the dynamic IP address corresponding to the ID of a receiving communication device when the server is notified of the ID of the receiving communication device from a transmitting communication device. It then notifies the transmitting communication device of the dynamic IP address of the receiving communication device to start communication between both the communication devices through the IP.

Furthermore, the server establishes a wireless link with the receiving communication device when the server is notified of the ID of the receiving communication device whose dynamic IP address has not been assigned. The server thus assigns the dynamic address to the receiving communication device to secure the communication through the IP between the communication devices having the dynamic IP addresses.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
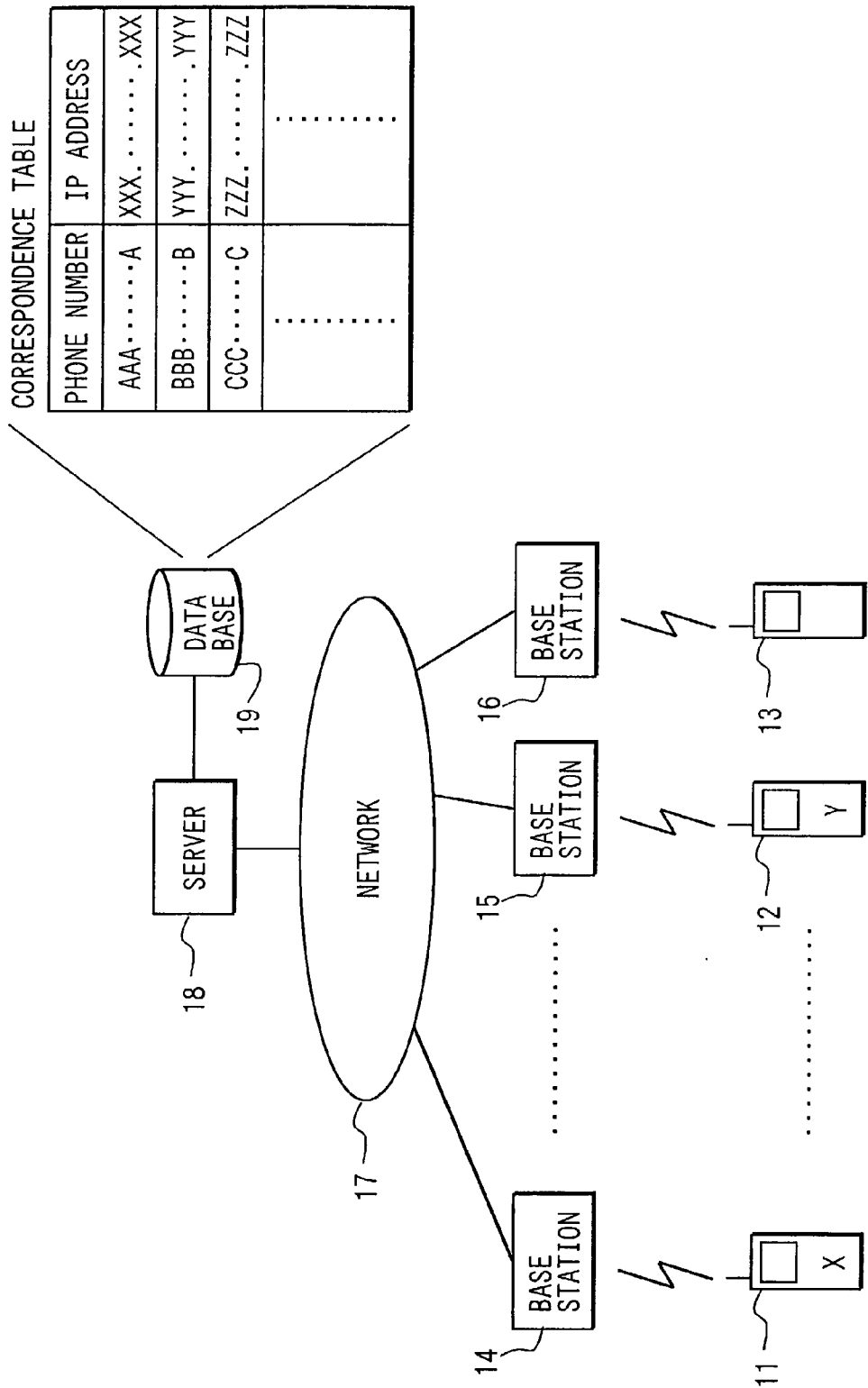
FIG. 1 is a diagram illustrating a communication system according to an embodiment of the present invention.

A communication system for cellular phones is schematically shown in FIG. 1. Cellular phones 11-13 communicate with each other or with a server 18 through corresponding base stations 14-16 and a network 17. The server 18 possesses, for instance, a dynamic host configuration protocol (DHCP) to manage parameters, in a lump, necessary for connection with the network 17. The parameters include a subnet mask, a broadcast and a default route address in addition to an IP address.

The server 18 accepts requests of dial-up connection from the cellular phones 11-13 to assign dynamic IP addresses to the cellular phones 11-13. On the contrary, the server 18 may request the dial-up connection to the cellular phones 11-13 to assign the dynamic IP addresses to the cellular phones 11-13. Here, the server 18 stores in a database 19 a table showing correspondence between phone numbers of the cellular phones 11-13 and the dynamic IP addresses assigned or to be assigned to the cellular phones 11-13.

Figure 2:
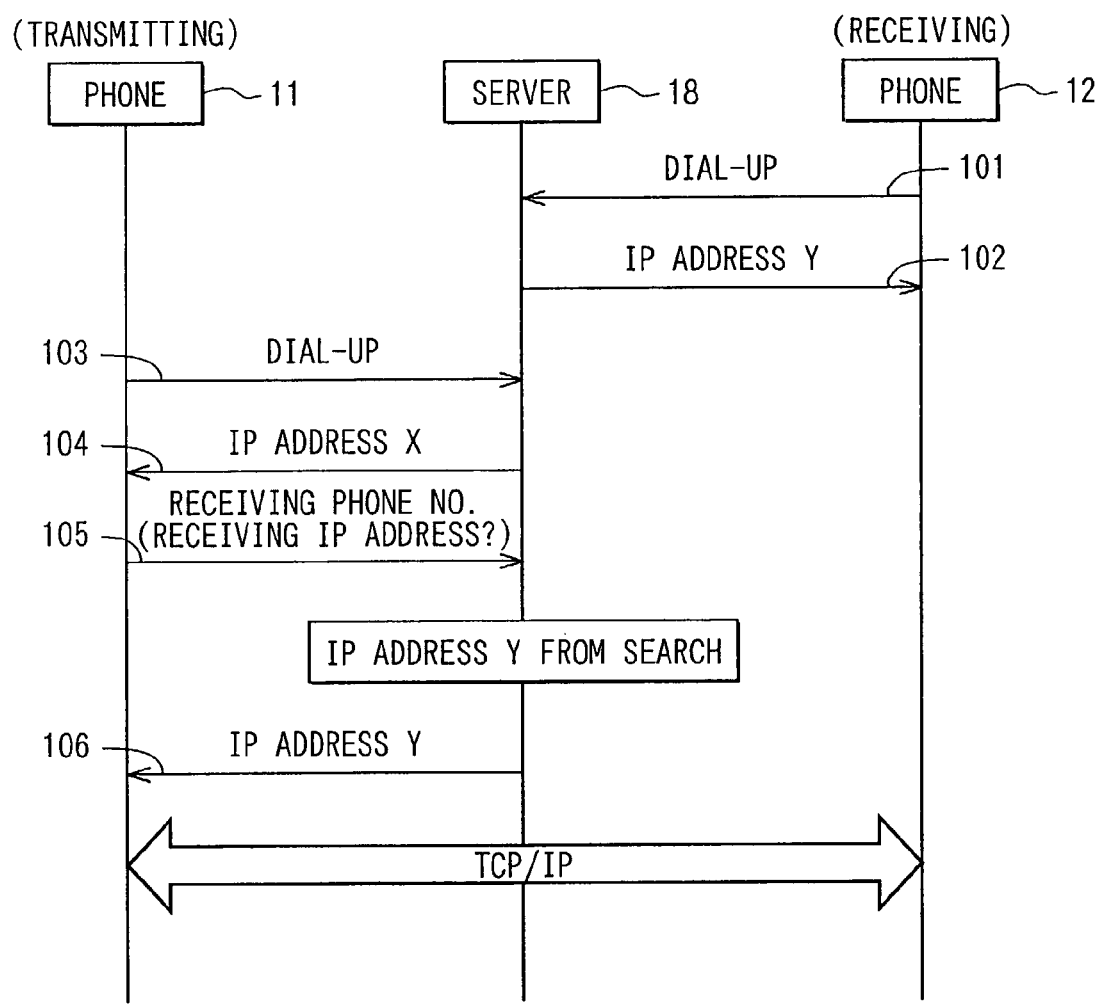
FIG. 2 is a diagram illustrating operations of the embodiment.
Figure 3:
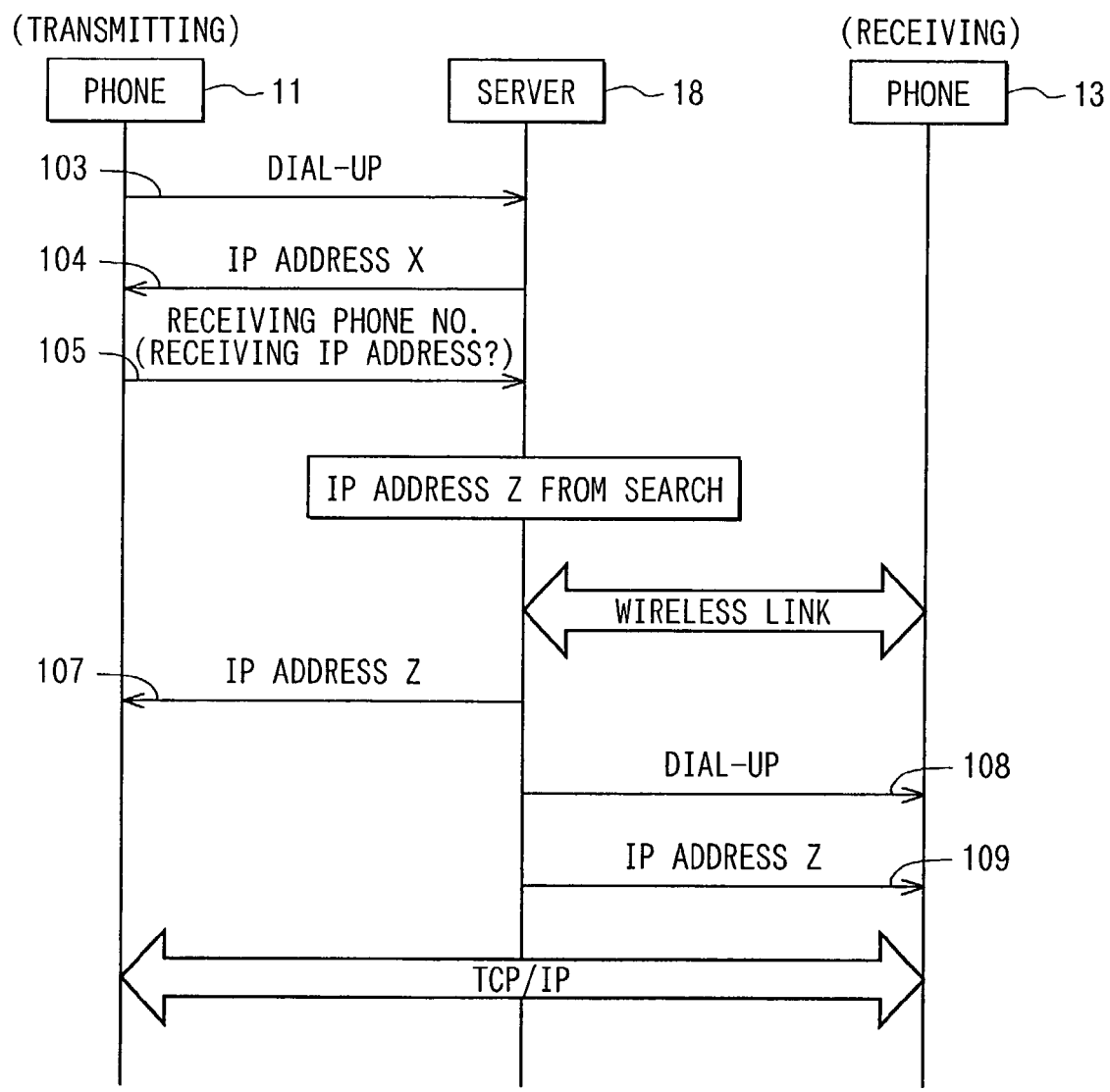
FIG. 3 is a diagram illustrating operations of the embodiment.
Figure 4:
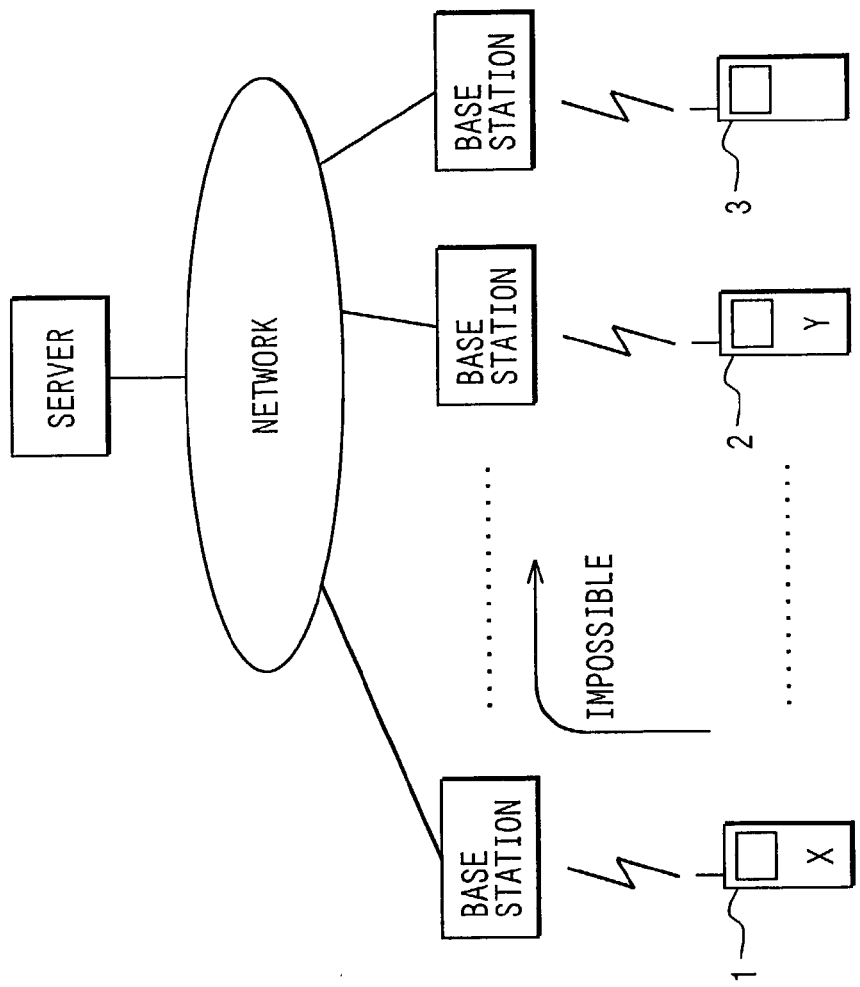
FIG. 4 is a schematic diagram illustrating a related art.

Referring to FIGS. 2 and 3, operations of the above system are explained in two different cases:

(1) a cellular phone 11 already having a dynamic IP address x connects through the IP with a cellular phone 12 also already having a dynamic IP address Y;

(2) a cellular phone 11 already having a dynamic IP address X connects through the IP with a cellular phone 12 not having a dynamic IP address Z.

In the first case (1), as shown in FIG. 2, at first, through a trigger of a user's predetermined input, the receiving cellular phone 12 establishes a wireless link with the server 18 to request the dial-up connection at step 101. The server 18 accepts the request from the cellular phone 12, notifying the cellular phone 12 of the dynamic IP address Y to assign it to the cellular phone 12 at step 102.

On the other hand, through a trigger of a user's predetermined input, the transmitting cellular phone 11 establishes a wireless link with the server 18 to request the dial-up connection at step 103. The server 18 accepts the request from the cellular phone 11, notifying the cellular phone 11 of the dynamic IP address X to assign it to the cellular phone 12 at step 104.

Under the condition of the dynamic IP addresses X and Y being respectively assigned to the cellular phones 11 and 12, the transmitting cellular phone 11 awaits a user's key input indicating the phone number of the receiving cellular phone 12. The transmitting cellular phone 11 notifies the server 18 of the phone number of the receiving cellular phone 12 inputted by the user, then inquiring the dynamic IP address assigned to the receiving cellular phone 12 at step 105. Here, the phone number may be input at a series of digits or at an abbreviated number.

The server 18 is notified of the phone number of the receiving cellular phone 12 by the transmitting cellular phone 11 to accept the inquiry of the dynamic IP address assigned to the receiving cellular phone 12. The server 18 then searches the corresponding table stored in the database 19 to obtain the dynamic IP address corresponding to the phone number of the receiving cellular phone 12. Here, the dynamic IP address Y has been already assigned to the receiving cellular phone 12 as described above. The server 18 hence notifies the transmitting cellular phone 11 of the obtained dynamic IP address Y at step 106.

The transmitting cellular phone 11 is notified of the dynamic IP address Y assigned to the receiving cellular phone 12 by the server 18. It then establishes transport control protocol/internet protocol (TCP/IP) connection with the receiving cellular phone 12 by using the notified dynamic IP address Y to communicate through the IP. Thus, the cellular phones 11 and 12 being assigned the dynamic IP addresses X and Y respectively are able to communicate with each other through the IP. Here, the phone number of the receiving cellular phone 12 being notified to the server 18 may be alternated with either of an electronic serial number (ESN) and an international subscriber identity (IMSI), both of which identify the receiving cellular phone 12.

In the above second case (2) as shown in FIG. 3, the receiving cellular phone 13 is not assigned the dynamic IP address. The server 18 is notified of the phone number of the receiving cellular phone 13 by the transmitting cellular phone 11 to accept the inquiry of the dynamic IP address assigned to the receiving cellular phone 13 at step 105. Although the server 18 then searches the corresponding table stored in the database 19, the dynamic IP address has not been assigned yet to the receiving cellular phone 13 as described above. The server 18 hence obtains the dynamic IP address Z to be subsequently assigned to the receiving cellular phone 13.

The server 18 then establishes a wireless link with the receiving cellular phone 13. The wireless link is established by sending a trigger signal to the receiving cellular phone 13 to make the receiving cellular phone 13 be forcibly ready for being notified of the dynamic IP address Z. Here, the trigger can be a command or short message utilizing a mailing function and others.

The server 18 then notifies the transmitting cellular phone 11 of the dynamic IP address Z at step 107. The server 18 requests the dial-up connection to the receiving cellular phone 13 at step 108. Then, the server 18 notifies the cellular phone 13 of the dynamic IP address Z, which is obtained before the wireless link has been established, to assign it to the cellular phone 13 at step 109.

The transmitting cellular phone 11 is notified of the dynamic IP address Z assigned to the receiving cellular phone 13 by the server 18. It then establishes the TCP/IP connection with the receiving cellular phone 13 by using the notified dynamic IP address Z to communicate through the IP. Thus, the cellular phones 11 and 13 being assigned the dynamic IP addresses X and Y respectively are able to communicate with each other through the IP.

Here, the dynamic IP addresses X, Y, and Z consist of 32 bits in version 4 (IPv4) or 128 bits in version 6 (IPv6).

The above cases (1) and (2) do not always separately occurs. Namely, the transmitting cellular phones 11 may notify the server 18 of the phone numbers of the cellular phones 12 and 13 simultaneously. Even in the instance, the transmitting cellular phone 11 is able to be notified, by the server 18, of the dynamic IP addresses Y and Z according to the operations described above, thereby communicating through the IP with the cellular phone 12 or 13.

Furthermore, the above embodiments may be modified as follows. The communication device includes not only a cellular phone but also a portable information device such as a personal digital assistant as long as it can be assigned the dynamic IP address. After establishing the wireless link between the server and the receiving cellular phone, the dial-up connection to the other can be requested not only by the server but also by the receiving cellular phone. Namely, the receiving cellular phone may request the dial-up connection to the server, thereby being assigned the dynamic IP address by the server.

What is claimed is:

1. A server for assigning a dynamic address of an internet protocol to a communication device, the server comprising:
   storing means which stores a table showing correspondence between identification numbers for communication devices and dynamic addresses of internet protocols for the communication devices;
   searching means which searches, when a communication device notifies an identification number for an opponent communication device, the table to obtain a dynamic address of an internet protocol corresponding to the identification number for the opponent communication device; and
   notifying means which notifies, when the searching means obtains from the table a dynamic address of an internet protocol corresponding to the identification number for the opponent communication device, the communication device of the obtained dynamic address, for the opponent communication device;
   wireless linking means which establishes, when the searching means does not obtain from the table a dynamic address of an internet protocol corresponding to the identification number for the opponent communication device, a wireless link with the opponent communication device; and
   assigning means which assigns a dynamic address of an internet protocol to the opponent communication device after the wireless link has been established.

2. A server as recited in claim 1, wherein the wireless linking means establishes the wireless link by sending to the opponent communication device a trigger signal to make the opponent communication device be forcibly ready for being notified of the dynamic address.

3. A server as recited in claim 1, wherein the wireless linking means establishes the wireless link by sending to the opponent communication device either of a command and a message to make the opponent communication device be forcibly ready for being notified of the dynamic address.

4. A server as recited in claim 1, wherein the assigning means assigns the dynamic address before the wireless link with the opponent communication device has been established.

5. A communication system comprising a server and communication devices, wherein the server includes:
storing means which stores a table showing correspondence between identification numbers for the communication devices and dynamic addresses of internet protocols for the communication devices;
searching means which searches, when a communication device notifies an identification number for an opponent communication device, the table to obtain a dynamic address of an internet protocol corresponding to the identification number for the opponent communication device;
notifying means which notifies, when the searching means obtains from the table a dynamic address of an internet protocol corresponding to the identification number for the opponent communication device, the communication device of the obtained dynamic address for the opponent communication device;
wireless linking means which establishes, when the searching means does not obtain from the table a dynamic address of an internet protocol corresponding to the identification number for the opponent communication device, a wireless link with the opponent communication device; and
assigning means which assigns a dynamic address of an internet protocol to the opponent communication device after the wireless link has been established,
wherein the communication devices include:
notifying means which notifies the server of the identification number for the opponent communication device; and
receiving means which receives from the server the dynamic address corresponding to the identification number for the opponent communication device according to the notification.

6. A method of notification of a dynamic address of an internet protocol, the method comprising steps of:
storing, in a server, a table showing correspondence between identification numbers for communication devices and dynamic addresses for the communication devices;
notifying, from a communication device, the server of an identification number for an opponent communication device;
searching the table to obtain a dynamic address of an internet protocol corresponding to the identification number for the opponent communication device; and
notifying, when a dynamic address of an internet protocol corresponding to the identification number for the opponent communication device is obtained from the table, the communication device of the obtained dynamic address for the opponent communication device; and
establishing, when a dynamic address of an internet protocol corresponding to the identification number for the opponent communication device is not obtained from the table, a wireless link with the opponent communication device, and then assigning a dynamic address of an internet protocol to the opponent communication device after the wireless link has been established,
notifying, from the server, the communication device of the dynamic address, which is obtained at the searching, for the opponent communication device.

7. A server for assigning a dynamic address of an internet protocol to a communication device, the server comprising:
storing means which stores a table showing correspondence between identification numbers for communication devices and dynamic addresses of internet protocols for the communication devices;
searching means which searches, when a communication device notifies an identification number for an opponent communication device, the table to obtain a dynamic address of an internet protocol corresponding to the identification number for the opponent communication device;
notifying means which notifies the communication device of the dynamic address, which is obtained by the searching means, for the opponent communication device;
wireless linking means which establishes a wireless link with the opponent communication device when the communication device notifies the identification number for the opponent communication device whose dynamic address has not been assigned; and
assigning means which assigns a dynamic address of an internet protocol to the opponent communication device after the wireless link has been established,
wherein the wireless linking means establishes the wireless link by sending to the opponent communication device a trigger signal to make the opponent communication device be forcibly ready for being notified of the dynamic address.

8. A server for assigning a dynamic address of an internet protocol to a communication device, the server comprising:
storing means which stores a table showing correspondence between identification numbers for communication devices and dynamic addresses of internet protocols for the communication devices;
searching means which searches, when a communication device notifies an identification number for an opponent communication device, the table to obtain a dynamic address of an internet protocol corresponding to the identification number for the opponent communication device;
notifying means which notifies the communication device of the dynamic address, which is obtained by the searching means, for the opponent communication device;
wireless linking means which establishes a wireless link with the opponent communication device when the communication device notifies the identification number for the opponent communication device whose dynamic address has not been assigned; and
assigning means which assigns a dynamic address of an internet protocol to the opponent communication device after the wireless link has been established,
wherein the wireless linking means establishes the wireless link by sending to the opponent communication device either of a command and a message to make the opponent communication device be forcibly ready for being notified of the dynamic address.

* * * * *